United States Patent [19]
Putty et al.

[11] Patent Number: 5,233,874
[45] Date of Patent: Aug. 10, 1993

[54] ACTIVE MICROACCELEROMETER

[75] Inventors: Michael W. Putty, East Detroit; David B. Hicks, Farmington Hills; Shih-Chia Chang, Bloomfield Hills; David S. Eddy, Romeo, all of Mich.

[73] Assignee: General Motors Corporation, Detroit, Mich.

[21] Appl. No.: 746,548

[22] Filed: Aug. 19, 1991

[51] Int. Cl.$^5$ .............................................. G01P 15/09
[52] U.S. Cl. ................................................. 73/517 AV
[58] Field of Search ........ 73/517 AV, 517 R, DIG. 1

[56] References Cited

U.S. PATENT DOCUMENTS

| | | | |
|---|---|---|---|
| 3,479,536 | 11/1969 | Norris ............................. | 73/517 AV |
| 4,306,456 | 12/1981 | Maerfeld ......................... | 73/517 R |
| 4,660,418 | 4/1987 | Greenwood et al. ............. | 73/517 R |
| 4,805,456 | 2/1989 | Howe et al. ..................... | 73/517 AV |
| 4,851,080 | 7/1989 | Howe et al. ..................... | 156/647 |
| 4,893,509 | 1/1990 | MacIver et al. ................. | 73/517 AV |
| 4,901,570 | 2/1990 | Chang et al. .................... | 73/517 AV |

FOREIGN PATENT DOCUMENTS

| | | | |
|---|---|---|---|
| 437397 | 7/1991 | European Pat. Off. .......... | 73/517 R |
| 10567 | 11/1989 | World Int. Prop. O. ........ | 73/517 AV |

OTHER PUBLICATIONS

Chen et al., "Integrated Silicon PI-FET Accelerometer with Proof Mass", Sensors and Actuators, 5 (1984), 119-126.

Primary Examiner—John E. Chapman
Attorney, Agent, or Firm—Robert J. Wallace; Domenica N. S. Hartman

[57] ABSTRACT

A microaccelerometer is provided for use in on-board automotive safety control and navigational systems. The microaccelerometer includes a central support body which is supported upon a backing chip, a peripheral proof mass which circumscribes the central support body, and at least one pair of microbridges, each of which are attached to both the central support body and the peripheral proof mass. The pair of microbridges extend outwardly in opposite directions from the central support body such that a longitudinal axis through each of the microbridges forms a common axis through the central support body. The microbridges are attached to the peripheral proof mass at the end opposite the central support body so as to suspend the peripheral proof mass circumferentially about the central support body and above the backing chip. Piezoelectric drivers and sensors are provided, respectively, for exciting the microbridges at their resonant frequencies, and for detecting changes in the resonant frequencies of the microbridges which occur as a function of acceleration of the peripheral proof mass. The sensors are connected to a feedback circuit which amplifies and buffers their output and provides feedback to the drivers to properly maintain the microbridges at their resonant frequencies.

4 Claims, 3 Drawing Sheets

ACTIVE MICROACCELEROMETER

This invention generally relates to sensors of the accelerometer type. More specifically, this invention relates to a two-axis silicon microaccelerometer having heavily-doped single-crystal silicon resonant microbridges which are driven by a piezoelectric driver. The construction of the microaccelerometer is characterized by low off-axis response while having reduced vacuum packaging requirements and improved structural ruggedness.

BACKGROUND OF THE INVENTION

An accelerometer is one of the primary sensors used in on-board automotive safety control systems and navigational systems, particularly inertial navigational systems. Examples of such automotive applications include anti-lock braking systems, active suspension systems, and seat belt lock-up systems.

More specifically, an accelerometer is a device which measures acceleration, or more accurately, accelerometers measure the force that is exerted by a body as the result of a change in the velocity of the body. A moving body possesses inertia which tends to resist the change in velocity. It is this resistance to any change in velocity that is the source of the force which is exerted by the moving body. This force is directly proportional to the acceleration component in the direction of movement when the moving body is accelerated.

In a conventional accelerometer, a mass is suspended between two spring members which are coaxially attached on opposite sides of the mass. The mass is maintained in a neutral position so long as the system is at rest or is in motion at a constant velocity. When the mass-spring system undergoes a change in velocity in the direction of the springs' axis, such as an acceleration or deceleration in that direction, the spring mounted mass will resist the movement because of its inertia. This resistance to the change in velocity will force one of the springs to be in tension while the other spring is compressed. Accordingly, the force acting on each spring is equal but opposite in magnitude. The well-known mathematical interrelationship of the three variables—force, weight and acceleration—provides that the force generated is equal to the product of the weight of the mass and the acceleration of the mass, divided by the gravitational constant.

Silicon-based microaccelerometers having resonant-type microbridges are also known. An example of this type of accelerometer is disclosed in U.S. Pat. No. 4,901,570 to Chang et al, assigned to the assignee of the present invention. Chang et al disclose a microaccelerometer having a central square-shaped proof mass which is suspended by at least one pair of resonant microbridges. The resonant bridges are attached to a supporting substrate which circumscribes the proof mass with a gap provided therebetween. As such, the central proof mass is supported within and has free movement relative to the supporting substrate. The individual microbridges within each pair of microbridges are positioned at opposing edges of the proof mass such that the pair's longitudinal axes constitute a common axis across the surface of the proof mass.

In a microaccelerometer employing resonant microbridges, acceleration in the plane of the substrate causes differential axial loads on oppositely disposed resonant microbridges, i.e., causes one supporting resonant bridge to be in compression and the other in tension. It is the inertial force of the proof mass which generates the axial load on the resonant microbridges. In turn, it is the compressive and tensile loads which produce a shift in the resonant frequencies associated with each resonant microbridge. The resulting difference between the resonant frequencies of the compressive and tensile members can then be measured and used to determine the magnitude of the acceleration component in the direction of the common axis shared by the pair of resonant microbridges.

The microbridges taught by Chang et al are driven electrostatically at their respective resonant frequencies by a separate drive electrode. The maximum amplitude of the vibration of each microbridge occurs when the microbridge is at resonance, whereby the frequency of the drive voltage which is supplied to the drive electrode coincides with the natural frequency of the microbridge. To sustain the microbridge in resonance, any shift in its resonant frequency due to the externally imposed stress of the proof mass must be compensated for by a corresponding change in the frequency of the drive electrode's drive voltage.

The frequency of vibration of each microbridge is detected by monitoring the change in a voltage-induced capacitance between the microbridge and a sensing electrode. The capacitance varies with time according to the frequency of vibration of the microbridge. By placing the sensing electrode in close proximity to the microbridge, the shift in the microbridge's frequency of vibration can be detected.

Since the resulting capacitance is small and stray capacitances are usually much larger than the sensed capacitance, the signal derived from the time-varying capacitance change must be amplified and buffered by an on-chip circuitry, such as a clamping diode in conjunction with a depletion mode n-channel metal-oxide-semiconductor field-effect transistor, or MOSFET. To sustain the microbridge in resonance, this enhanced signal is provided through feedback circuitry to the drive electrode, causing the frequency of the drive voltage to change so that it again coincides with the shifted resonant frequency of the microbridge.

This type of resonant microaccelerometer is attractive for precision measurements because the frequency of a micromechanical resonant structure exhibits good linearity with high sensitivity, resolution, and bandwidth. However, a shortcoming of such structures as that taught by Chang et al is that the gap between the sensing electrode and the corresponding microbridge must be sufficiently small so as to maximize the capacitance being detected. This requirement necessitates the evacuation of the microaccelerometer package so as to reduce the damping effects of the air squeezed between the components, typically referred to as a squeeze film effect.

For purposes of assessing the quality of a vibrating structure as a harmonic oscillator, the art has derived a dimensionless number which is referred to as the quality factor (Q). The quality factor of a given structure is inversely related to the damping factor associated with the structure and generally relates to the sharpness or width of the response curve in the vicinity of the resonant frequency of the vibrating structure. The concepts of quality factor, damping, and resonant frequencies are primary factors when considering the vibrational characteristics of a vibrating structure, and will therefore be referred to and further discussed in relation to the present invention.

With regards to the microaccelerometer taught by Chang et al, the evacuation of the microaccelerometer package is necessary to reduce the damping effects of the air in order to achieve a high quality factor. As an example, testing has indicated that vacuum packaging of approximately 100 mTorr is necessary to achieve a quality factor of 600 with the structure taught by Chang et al. Microbridge resonance cannot be initiated in the structure taught by Chang et al when operated at one atmosphere as a consequence of the high damping effect of the air, and hence a low quality factor.

Another significant shortcoming of the teachings of Chang et al is that the microaccelerometer structure exhibits a relatively high off-axis (which is the axis orthogonal to the plane in which acceleration is being detected) response on the order of 10% as compared to the on-axis response. The off-axis response is attributed to a geometrical mismatch between the paired microbridges. The mismatch itself is created in part by non-ideal microfabrication techniques which produce less than ideal symmetry of the proof mass and bridge dimensions. As a result, the bridges are asymmetrically stressed and therefore have different resonant frequencies. Another factor is the package-induced stresses within the bridges which result from such conditions as less than perfect positioning of the proof mass relative to the supporting substrate and inherent stresses associated with the bonding and packaging techniques employed. As a result, the bridges are further asymmetrically stressed.

The detrimental effects of this geometric mismatch are exacerbated by the resonant frequency measuring technique adopted by Chang et al. For an electrostatic drive as taught by Chang et al, the electrically measured resonant frequency is a strong function of the gap obtained between the bridge and drive electrode, and thus, this effect on the measured resonant frequency is amplified. This sensitivity produces an erroneous shift in the measured resonant frequency of each microbridge as detected by the sensing electrode. As a result, the unequal built-in stresses associated with a pair of microbridges directly contribute to a resonant frequency error which does not cancel out during computation. The result is an erroneous acceleration amplitude reading.

Therefore, it would be advantageous to provide a microaccelerometer which employs silicon integrated circuit technology while minimizing the effects of any geometrical mismatch of the microaccelerometer's construction. In addition, it would be advantageous to provide a microaccelerometer which does not employ an electrostatic driver for driving the microbridges at their resonant frequencies, so as to alleviate the shortcomings associated with the prior art. Finally, it would be desireable to reduce the microaccelerometer package's vacuum requirements while maintaining or improving the microaccelerometer's quality factor.

SUMMARY OF THE INVENTION

It is an object of the present invention to provide a single-crystal silicon microaccelerometer which is suitable for use in automotive applications.

It is a further object of this invention that such a microaccelerometer employ a support body, proof mass and at least one pair of microbridges which are constructed and arranged so as to minimize the adverse effects of any geometrical mismatch therebetween.

It is still a further object of this invention that the microaccelerometer employ a microbridge driver and sensor which operate piezoelectrically, thereby avoiding exacerbation of the adverse influence that geometrical mismatch has on the measured resonant frequency of each microbridge.

It is yet another object of this invention that the support body be attached to the microaccelerometer package so as to avoid propagation of any packaging-induced stresses to the microbridges.

It is a further object of this invention that the microaccelerometer employ on-chip circuitry to amplify and buffer the sensor signal derived from detecting the acceleration-induced stresses in the microbridges.

Lastly, it is still a further object of the present invention that the package vacuum requirement for the microaccelerometer be capable of being relaxed while still achieving satisfactory vibrational response from the microbridges and at the same time attaining critical damping for the proof mass.

In accordance with a preferred embodiment of this invention, these and other objects and advantages are accomplished as follows.

A microaccelerometer is provided which is suitably rugged for use in on-board automotive safety control and navigational systems. The microaccelerometer includes a backing chip, a central support body supported upon the backing chip, a peripheral proof mass which circumscribes the central support body, and at least one pair of microbridges, each microbridge being attached to both the central support body and the peripheral proof mass. A gap is provided between the central support body's perimeter and the peripheral proof mass. The gap is sufficient to prevent physical interference between the peripheral proof mass and the central support body when the peripheral proof mass is displaced relative to the central support body.

The pair of microbridges extend outwardly in opposite directions from the central support body such that a longitudinal axis through each of the microbridges forms a common axis through the central support body. The microbridges are attached to the peripheral proof mass at their ends opposite to the central support body so as to suspend the peripheral proof mass circumferentially about the central support body and above the backing chip.

A driving device is provided on each microbridge for exciting the microbridge at its resonant frequencies. The driving devices operate piezoelectrically to induce stresses parallel to the plane of the microbridges at a frequency corresponding to each microbridge's resonant frequency. In so doing, the driving devices are able to drive their corresponding microbridges at their resonant frequencies. However, the resonant frequencies of the microbridges shift when under tension or compression as a consequence of the peripheral proof mass's acceleration in the direction of the common axis of the microbridges. Therefore, piezoelectric sensors are provided for detecting the shift in the resonant frequency of each microbridge during acceleration of the proof mass. The piezoelectric sensors respond to the change in stress within each microbridge, which correspond to a change in the frequency of vibration of the microbridge.

As such, by comparing the shifted resonant frequencies of opposing microbridges, the piezoelectric sensors provide an output which indicates the acceleration (or deceleration) of the peripheral proof mass in the direction of the opposing microbridges, common axis. Circuitry connected to the individual piezoelectric sensors provides amplification and buffering of the output signal to enhance the signal.

Together the piezoelectric driver and sensors form a frequency-measuring circuit for each microbridge which is preferably formed so as to be integral with the supporting substrate of both the peripheral proof mass and the central support body. This frequency-measuring circuitry is connected to a feedback circuit which produces an output signal corresponding to the change in difference between frequencies for the pair of microbridges. The feedback circuitry provides feedback to the driving devices to allow each driving device to compensate for the change in resonant frequency of each microbridge. As a result, each driving device is able to properly maintain its corresponding microbridge at its resonant frequency.

In a preferred embodiment, a second pair of microbridges are similarly attached to opposite sides of the central support body and form a second common axis which is perpendicular to the common axis formed by the first pair of microbridges. Again, each microbridge is excited to vibrate at its respective resonant frequency, and the magnitude of the difference in resonant frequency between the members of each pair due to the acceleration is then measured to provide an indication of acceleration along the common axis formed by the respective pair of microbridges.

A particularly advantageous feature of this invention is that the proof mass of the microaccelerometer is provided as a peripheral proof mass which eliminates the effects of packaging-induced stress. Another distinct advantage of the present invention is that the microbridges are driven and sensed piezoelectrically, which eliminates the presence of the narrow gap underneath the microbridge and thus avoids exacerbation of the detrimental effects due to any deviation from four-fold symmetry of the proof mass and the presence of any geometrical mismatch between each pair of microbridges. A further advantage is that due to the elimination of the narrow gap underneath the microbridge, the squeeze film effect is avoided and hence, packaging vacuum requirements may be relaxed without detrimental results to the operation of the microaccelerometer.

Other objects and advantages of this invention will be better appreciated from the detailed description thereof, which follows.

BRIEF DESCRIPTION OF THE DRAWINGS

The above and other advantages of this invention will become more apparent from the following description taken in conjunction with the accompanying drawings wherein.

DETAILED DESCRIPTION OF THE PREFERRED EMBODIMENTS

Figure 1:
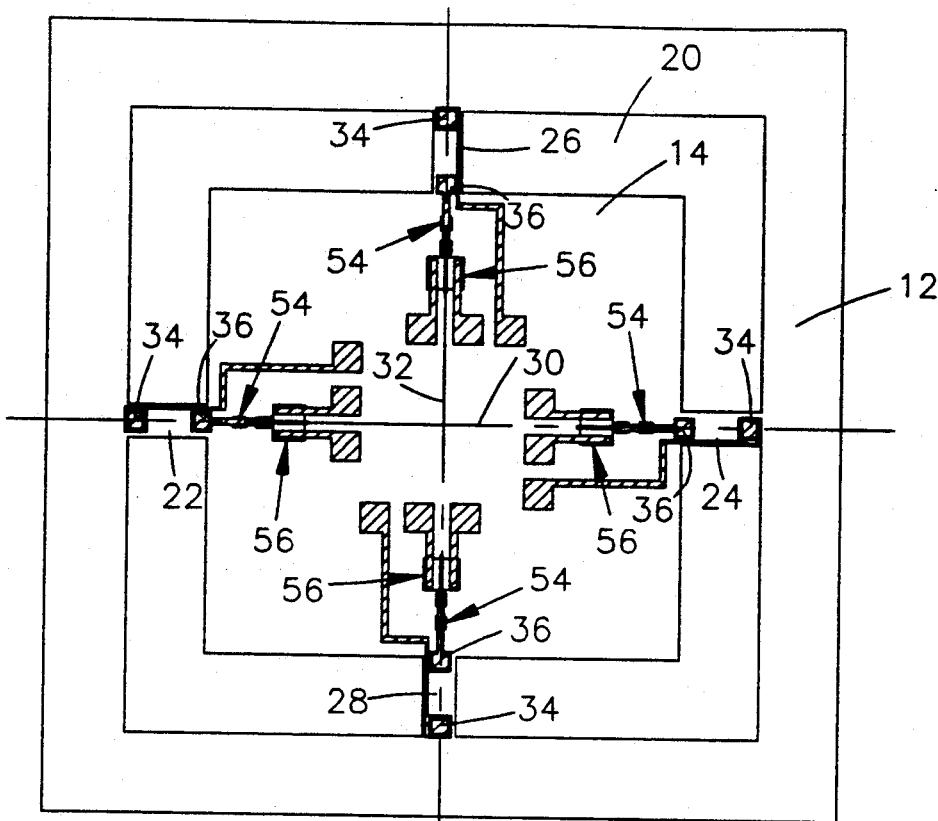
FIG. 1 is a plan view of the construction and arrangement of a microaccelerometer in accordance with a preferred embodiment of the present invention.
Figure 2:
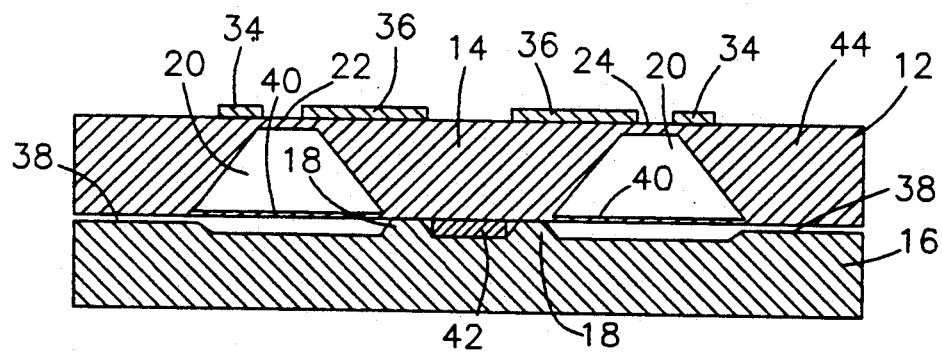
FIG. 2 is a cross-sectional view of the microaccelerometer of FIG. 1.
Figure 3:
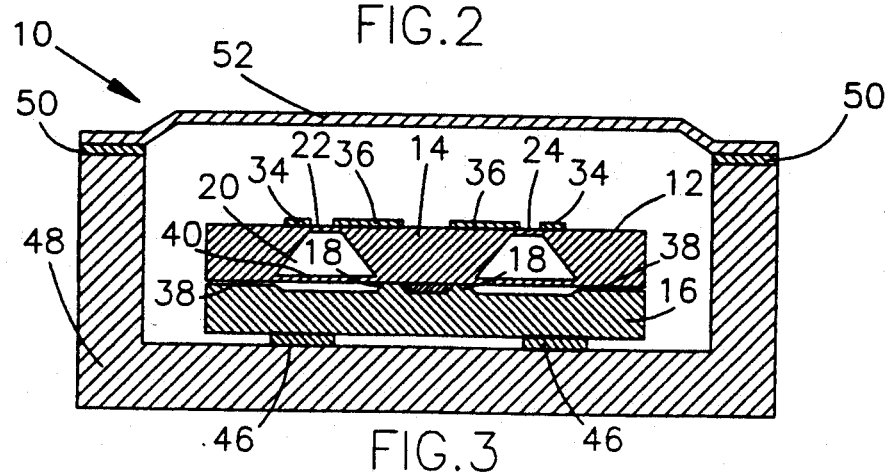
FIG. 3 is a cross-sectional view of the microaccelerometer of FIG. 1 as encapsulated within a microaccelerometer package.

A resonant bridge microaccelerometer is disclosed which measures acceleration in the plane of a silicon substrate forming the primary components of the microaccelerometer. In a preferred embodiment illustrated in FIG. 1, this invention comprehends a two-axis single crystal silicon microaccelerometer 10 having a peripheral proof mass 12 which movably circumscribes a central support body 14. The peripheral proof mass 12 and the central support body 14 lie in a plane designated as the x-y plane of the microaccelerometer 10. As seen in FIG. 2, the central support body 14 is supported above a backing chip 16 by a plurality of support members 18 which extend upwardly (in the z-direction) from the upper surface of the backing chip 16. The central support body 14 is secured to the backing chip 16 with a suitable epoxy 42. A gap 20 is provided between the central support body's perimeter and the peripheral proof mass 12 such that no physical interference exists between the peripheral proof mass 12 and the central support body 14 when the peripheral proof mass 12 is displaced in the z-direction.

To limit displacement of the peripheral proof mass 12 in the z-direction (i.e. perpendicular to the x-y plane), the backing chip 16 is provided with mechanical stoppers 38 near its perimeter. In addition, constraining bridges 40 are provided on the lower surface of the central support body 14 to prevent rotational movement of the peripheral proof mass 12 and to inhibit its z-directional displacement. Accordingly, the movement of the peripheral proof mass 12 is predominantly limited to the x-y plane. Although the backing chip is not absolutely necessary for the operation of the microaccelerometer, it is preferred that the backing chip be used for the above purposes.

With reference again to FIG. 1, two pairs of microbridges 22, 24 and 26, 28 are preferably provided for suspending the peripheral proof mass 12 from the central support body 14 and above the backing chip 16. The microbridges 22 and 24 of the first pair are oriented such that their longitudinal axes are parallel to the x-axis, while the microbridges 26 and 28 of the second pair are oriented such that their longitudinal axes are parallel to the y-axis. As shown in FIG. 2, the microbridges 22, 24 and 26, 28 are formed to be substantially coplanar with the upper surface 44 of the central support body 14. Each pair is orthogonally attached to opposite sides of the central support body 14 and span the gap 20 between the central support body 14 and the peripheral proof mass 12. The microbridges 22, 24 and 26, 28 are also formed to be coplanar with and orthogonally attached to an adjacent edge of the peripheral proof mass 12.

Each pair of microbridges is oriented such that each member of a microbridge pair is longitudinally aligned with the other to form a common axis. As illustrated, the first microbridge pair 22 and 24 form a common axis 30 parallel to the x-axis while the second microbridge pair 26 and 28 form a common axis 32 parallel to the y-axis. The common axes 30 and 32 are perpendicular to each other such that excessive movement of the peripheral proof mass 12 is inhibited in both the x-direction and the y-direction.

The microbridges 22, 24 and 26, 28 are formed from single-crystal silicon heavily doped with boron, and therefore are under tensile stress. Internal stresses within the microbridges 22, 24 and 26, 28 are dependant in part upon the dopant species, dopant concentration, and the post-doping heat treatment. The microbridges 22, 24 and 26, 28 can be formed such that the level of internal stress within the microbridge member is minimal, preferably stress-free or under minimal tensile stresses.

In addition, the microbridge pairs are geometrically matched as nearly as possible such that a given microbridge pair will experience differential axial stresses of nearly equal (though opposite) magnitude during acceleration of the peripheral proof mass 12. Ideally, geometrical matching also provides a common mode rejection capability such that stresses induced by temperature and material effects and z-directional forces, are cancelled. However, this capability is severely reduced as microbridge pairs diverge from an ideal geometrical match. As will become apparent, the effect of geometrical mismatch is greatly reduced by the advantageous features of the present invention.

The acceleration component aligned with each microbridge pair 22, 24 and 26, 28 is measured through the use of a fibration drive means 34 and a fibration sense means 36 assigned to each microbridge 22, 24 and 26, 28. Both the drive means 34 and sense means 36 are piezoelectric elements composed of a zinc oxide (ZnO) film. The desired properties of the ZnO film include a high electromechanical coupling constant, high electrical resistance, and low intrinsic stress—i.e. stress-free or slightly under tensile stress. The thickness of the ZnO film used was in the range of about 0.5 to about 1.0 microns, because this was a sufficient thickness for piezoelectric operation, yet not excessively thick so as to impair the movement of the microbridge 22,24 and 26, 28. Foreseeably, other suitable piezoelectric material such as lead zirconate titanate (PZT) or aluminum nitride (AlN) could also be used.

In plan view, portions 34 and 36 of the zinc oxide film appear as if they were electrodes on the ends of the microbridges. Hence, they are hereinafter referred to as electrodes.

Each drive electrode 34 is positioned on one end of microbridge 22, 24 and 26, 28. When a voltage is applied to the drive electrode 34, the piezoelectric effect induces a stress in the microbridge parallel to the common axis 30 or 32 of the pair of microbridges. By alternating the voltage to the drive electrode 34, the microbridge can be driven at its mechanical resonant frequency— that is, the frequency at which the microbridge's maximum amplitude of vibration occurs. To sustain the microbridge at resonance, the frequency of the drive electrode's voltage, and thus the induced stress, is tuned to coincide with the resonant frequency of the microbridge.

Figure 4:
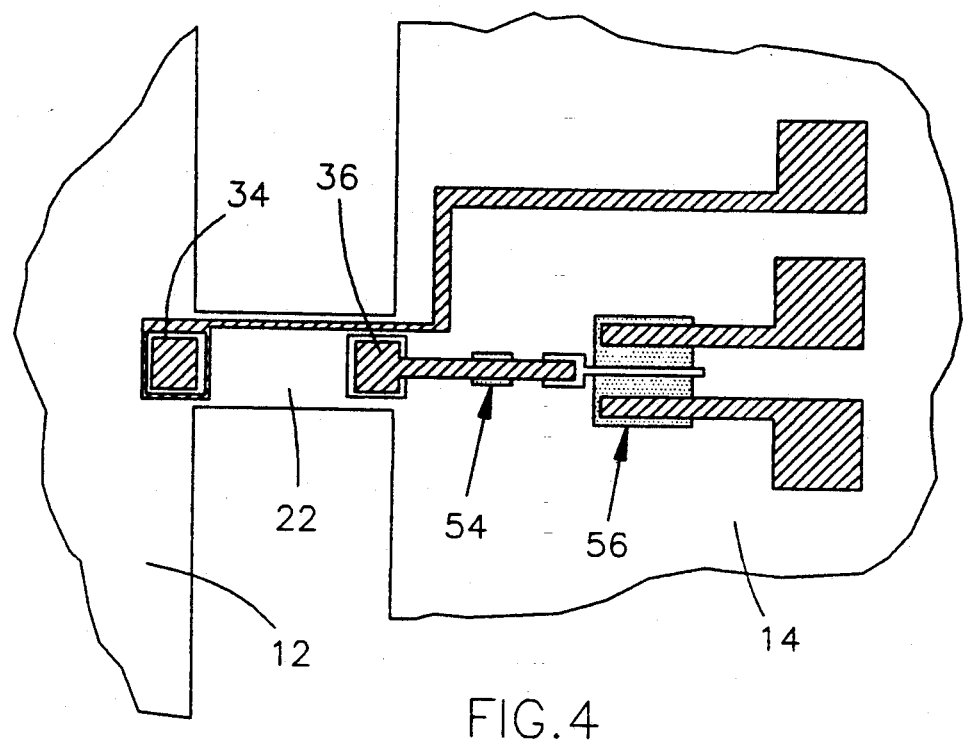
FIG. 4 is a detailed plan view of the piezoelectric drive and sense electrodes of the microaccelerometer of FIG. 1 in accordance with a preferred embodiment of the present invention.

In a preferred embodiment, the sense electrodes 36 are located on the end of the microbridges 22, 24 and 26, 28 opposite their corresponding drive electrodes 34, as best seen in FIG. 4. The vibration of each microbridge 22, 24 and 26, 28 generates a time-varying strain within the microbridge which is sensed piezoelectrically by the sense electrode 36. As a result, the sense electrode 36 is able to sense any shift in the resonant frequency of the microbridge which occurs when the corresponding pair of microbridges are under the tensile/compressive stresses induced by the acceleration of the peripheral proof mass 12.

The sense electrodes 36 convert the resulting strain into a voltage. Because the resulting voltage is small, the sense electrodes 36 are each accompanied by an on-chip circuitry consisting of a clamping diode 54 and a depletion-mode n-channel MOSFET 56. The on-chip circuitry acts to buffer and amplify the sense electrode's output to provide a more readily detectible output signal. To sustain the microbridge in resonance, this enhanced signal is provided through a feedback circuitry (not shown) to the drive electrodes 34, causing the frequency of the drive electrode 34 to change so that it again coincides with the shifted resonant frequencies of the microbridges 22, 24 and 26, 28.

In order to induce the necessary stress within the corresponding microbridge, it is preferable to mount the drive electrode 34 on the end of the microbridge attached to the peripheral proof mass 12, as illustrated in FIG. 4. Alternative embodiments which are not illustrated are also suitable for purposes of the present invention. A first alternative embodiment has the positions of the drive electrode 34 and the sense electrode 36 reversed, with the drive electrode 34 placed on the end of the microbridge attached to the central support body 14 and the sense electrode 36 placed on the end of the microbridge attached to the peripheral proof mass 12. Another embodiment involves placing both the drive electrode 34 and the sense electrode 36 in parallel lengthwise on the microbridge. Preferably, the drive electrode 34 is located on the corresponding axis 30 or 32 while the sense electrode 36 is provided as a pair of electrodes positioned on both sides of the drive electrode 34. Yet another embodiment involves locating the drive electrode 34 at both ends of each microbridge while the sense electrode 36 is located between the drive electrodes 34 approximately in the middle of the microbridge.

When considering to each of the above alternative embodiments, of significant importance is that both the drive electrodes 34 and the sense electrodes 36 are positioned such that they do not cross the points of inflection of the fundamental flexure mode of the microbridge. The points of inflection for a beam with both ends clamped are located approximately one fourth of the beam length from the clamping ends. Consequently, the length of the ZnO films which comprise the drive and sense electrodes 34 and 36 should extend less than about one fourth of the length of the microbridges 22, 24 and 26, 28.

The inertial force on the peripheral proof mass 12, due to acceleration in the x-y plane of the microaccelerometer, generates the differential axial loads on the opposing microbridges 22, 24 and 26, 28. The resulting compressive and tensional loads on the microbridges cause a shift in their corresponding resonant frequencies. This effect produces a change in the difference between the respective resonant frequencies of each member of a pair of microbridges. The magnitude of this change in difference between resonant frequencies in a bridge pair corresponds to the acceleration of the peripheral proof mass 12 along one of the common axes 30 and 32 formed by the respective bridge pair.

For purposes of illustration, an x-axis acceleration component, $a_x$, results in an inertial force, defined by the equation $F_i = -ma_x$, on the peripheral proof mass 12. The inertial force $F_i$ is predominantly shared by the microbridges 22, 24 aligned on the common axis 30 in the x-axis direction, as illustrated in FIG. 1. The acceleration in the x-axis direction causes one of the pair, microbridge 22 as illustrated, to be in compression while the other microbridge 24 is in tension. The states of compression and tension cause a shift in the resonant frequencies $f_{x1}$ and $f_{x2}$ in the microbridges 22 and 24, respectively.

An analysis based upon Rayleigh's Energy Method, assuming the fundamental vibrational mode, leads to the following expression for the resonant frequency of the microbridge 24 in tension. Therefore:

$$f_{x2} = f_o[1 + 0.293(l^2/EWt^3)(0.5ma_x)]^{0.5}$$

where $f_o$ is the unperturbed resonant frequency, E is the Young's modulus of elasticity for the material and l, W and t are the length, width and thickness of the microbridge, respectively. For simplicity, this result neglects the very minimal load-sharing provided by the microbridges 26 and 28 provided in the orthogonal direction.

By subtracting the corresponding expression for the member in compression, i.e. microbridge 22, and considering small perturbations, the difference in frequencies becomes:

$$\Delta f_x = f_{x2} - f_{x1} = (0.146 f_o m l^2 / EWt^3) a_x = s_x a_x,$$

where $S_x$ is defined as the sensitivity to x-axis acceleration components. From this analytical result, the x-axis acceleration component may be determined. In addition, the above relationships may be used to determine the y-axis component of acceleration also.

A z-axis component of acceleration, which is the axis orthogonal to the x-y plane of the peripheral proof mass 12, causes vertical displacement of the peripheral proof mass 12. For small vertical displacements, the resulting perturbations in $f_{x1}$ and $f_{x2}$, for the x-axis component, are common to both bridges 22 and 24 aligned with the x-axis, and are therefore cancelled by common mode rejection in $f_x$. Additional restraint on the z-axis displacement of the peripheral proof mass 12 is provided by the mechanical stoppers 38 so as to ensure only small vertical displacements over a practical range of acceleration in the z-axis. As noted before, geometrical matching of the pair of microbridges 22 and 24 will also ameliorate the effect of the z-axis component. However, historically the ability to minimize geometrical mismatching has been limited by the capabilities of the fabrication process and technologies.

However, inventive features of the present invention are able to minimize the influence of geometrical mismatching. Firstly, the drive electrodes 34 operate piezoelectrically. Therefore, their operation does not rely upon a polarization voltage which, as noted with the electrostatic drivers of the prior art, is adversely influenced by geometrical mismatch between the microbridge pairs 22, 24 and 26, 28. Secondly, the placing of the sense electrodes 36 directly on the microbridges eliminates the gap previously necessary therebetween with the electrostatic microaccelerometer of the prior art. Accordingly, the influence of the gap distance—a product of processing variations—on the sensed capacitance, and hence the detected frequency, is eliminated.

In addition, the structure of the microaccelerometer allows for better control of the z-directional spacing between the microbridges 22, 24 and 26, 28 and the backing chip 16, and the z-directional spacing between the bottom surface of the peripheral proof mass 12 and the backing chip 16. In the preferred embodiment, the spacing of the microbridges 22, 24 and 26, 28 with the backing chip 16 is the thickness of a 3 inch wafer—approximately 400 microns, while the spacing between the bottom surface of the peripheral proof mass 12 and the mechanical stops 38 of the backing chip 16 can be controlled to be approximately 10 microns. Another advantage is that the central support body 14 is attached to the backing chip 16 at a point remote from the peripheral proof mass 12 and the microbridges 22, 24 and 26, 28. As a result, package-induced stresses are completely isolated from the microbridges 22, 24 and 26, 28.

The preferred method for forming the microaccelerometer 10 of the present invention uses bulk and surface micromachining techniques particularly suitable for single-crystal silicon. In addition, the preferred method employs orientation-dependent silicon etching to form the peripheral proof mass 12 and other components. Considerations for the fabrication of the microaccelerometer pertain to the process integration of the active devices of the sense electrodes 36 with the micromechanical structures of the device. For example, the thermal budget for high temperature processes and the overall fabrication sequence must be coordinated such that both the active devices and the micro-mechanical structures function as intended. The process sequence described below is capable of integrating the required devices on the same chip without compromising their performance.

Using conventional and unconventional semiconductor fabrication techniques, the preferred fabrication process for the microaccelerometer requires employing three different technologies to form a micromachined mechanical structure (the peripheral proof mass 12 and the microbridges 22, 24 and 26, 28); an electrically transductive material (the ZnO thin film for the drive and sense electrodes 34 and 36); and a conventional silicon active device (the MOSFET 56). Starting with a standard single-crystal silicon substrate oriented along the [100] crystallographic plane 62, two deep boron diffusions are carried out by high temperature diffusion using a boron oxide source. The boron concentration must be greater than about $5 \times 10^{19}$ cm$^{-3}$ to ensure a hard etch-stop in ethylene diamine pyrocatechol (EDP) or potassium hydroxide (KOH), which are the more commonly used etchants for the micromachining of silicon structures.

Figure 5:
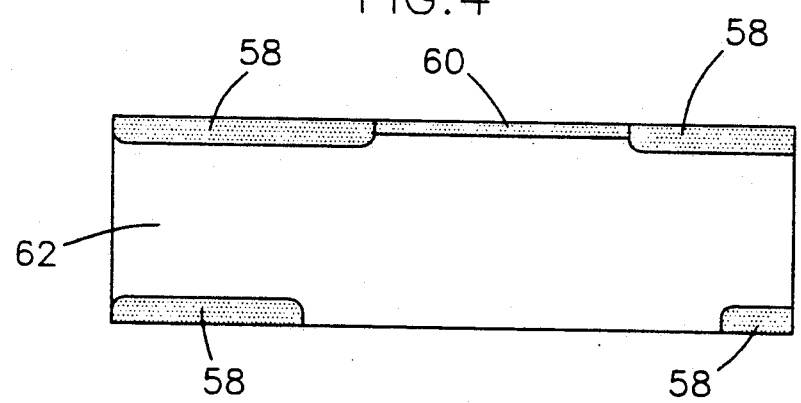
FIGS. 5 through 7 illustrate the preferred processing steps for forming the resonant bridge structure and piezoelectric drive and sense electrodes of FIG. 4 in accordance with a preferred embodiment of the present invention.

A series of first heavily-doped boron layers 58 are selectively formed to be approximately ten microns thick on both sides of the substrate 62, as illustrated in FIG. 5. The first layer 58 defines the length of the microbridges 22, 24 and 26, 28 and provides the etch mask for the EDP etch of the substrate 62 which forms the peripheral proof mass 12 and the microbridges 22, 24 and 26, 28. The constraining bridges 40 will also be formed from the first boron-doped layer 58 on the lower surface of the substrate 62. The ten micron thickness of the constraining bridges 40 helps restrain z-directional displacement of the peripheral proof mass 12 to approximately 0.2 microns when submitted to a 1 g z-directional acceleration. A second heavily-doped boron layer 60 is formed to be approximately 4 microns thick. The second layer 60 defines the thickness and width of the microbridges 22, 24 and 26, 28, which in the preferred embodiment were approximately 4 microns and 100 microns, respectively.

The MOSFETs and diodes associated with the sense electrodes 36 are fabricated prior to the ZnO thin film processes and the formation of both the resonant microbridges 22, 24 and 26, 28 and the peripheral proof mass 12. Such a process arrangement gives better control of the MOSFET fabrication temperatures of approximately 900° C. which might otherwise cause the ZnO films to interact with the adjacent layers, thus leading to contamination.

To prevent excessive dopant diffusion, arsenic implantations of approximately $5 \times 10^{11} cm^{-2}$ at 150 keV were used for adjustment of the threshold voltage. Phosphorus implantations of approximately $5 \times 10^{15} cm^{-2}$ at 150 keV were used to form the source and drain regions of the MOSFET. Low pressure chemical vapor deposition (LPCVD) polysilicon was used for the gate electrode of the MOSFET. In the preferred embodiment, the length and width of the MOSFET channel were approximately 10 microns and 100 microns, respectively.

Figure 6:
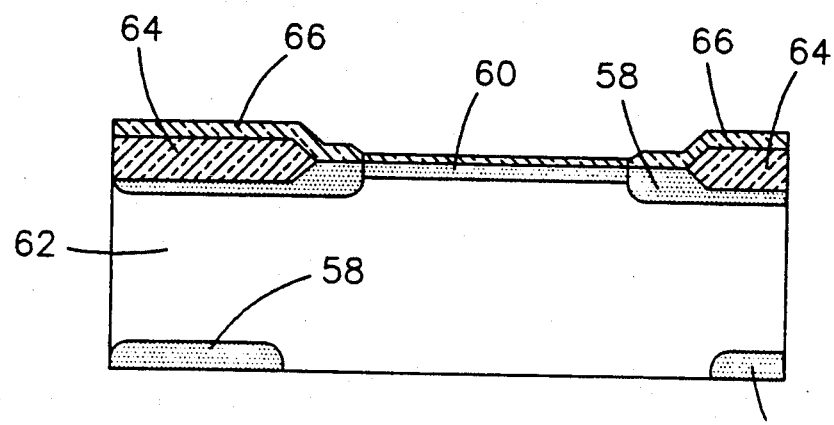

Insulating field silicon dioxide ($SiO_2$) regions 64 having a thickness of 1.0 micron were selectively grown into the first boron-doped layers 58 on the upper surface of the substrate 62, as shown in FIG. 6. The field $SiO_2$ regions 64 reduced the stray capacitance associated with the electrical interconnects of the frequency-measuring circuit. A phosphosilicate glass (PSG) layer 66 was then deposited upon the field $SiO_2$ regions 64. A second insulating $SiO_2$ layer 67 was grown upon the second boron-doped layer 60 to a thickness of about 0.1 microns.

The ZnO films for the drive and sense electrodes 34 and 36 were prepared by using an rf magnetron sputter-deposition technique. For providing good crystallinity and low internal stresses, the substrate 62 was heated to approximately 275° C. during deposition of the ZnO film to the substrate 62. The thickness of the ZnO films were in the range of approximately 0.5 to 1.0 microns while their widths and lengths were delineated by using a wet chemical etching of a 5% solution of ammonium chloride ($NH_4Cl$) at about 55° C. Other materials used in fabricating the microaccelerometer—aluminum, silicon and silicon oxide—appeared to withstand attack by the ZnO etchant.

Figure 7:
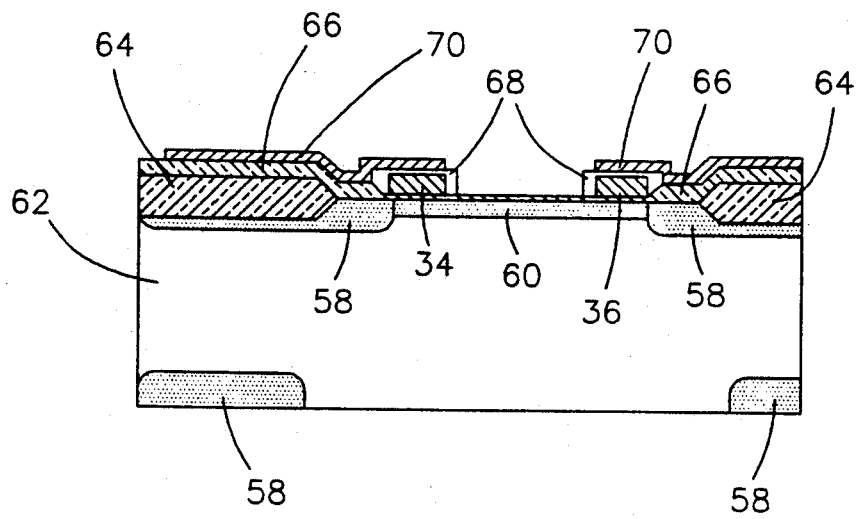
Figure 8:
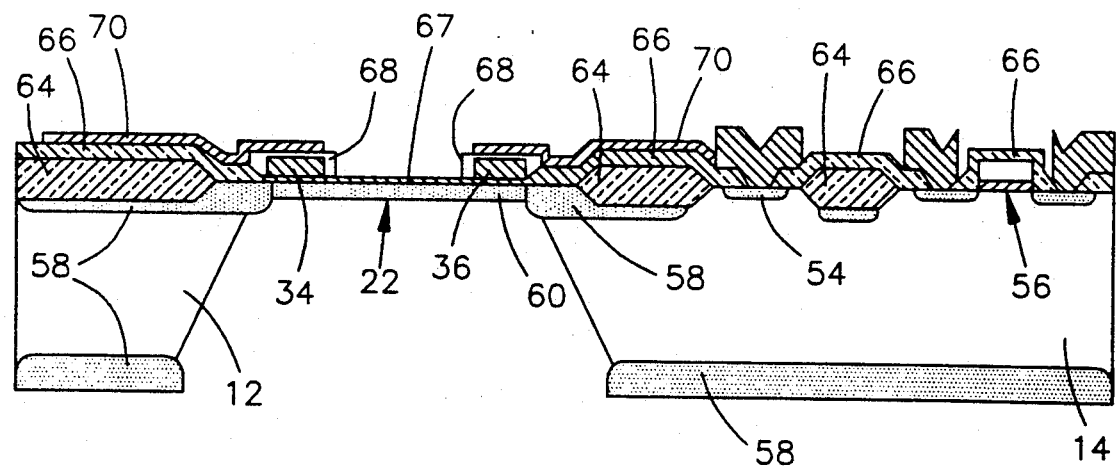
FIG. 8 is a cross-sectional view of the piezoelectric drive and sense electrodes of FIG. 4.

Next, a layer 68 of silicon nitride ($Si_3N_4$) was deposited to a thickness of approximately 0.1 microns to encapsulate the ZnO films, as shown in FIG. 7. During the deposition of the silicon nitride layer 68 the substrate 62 wash held at approximately 275° C. The silicon nitride layer 68 was provided to prevent the ZnO films from being attacked by the EDP subsequently used in the micromachining of the peripheral proof mass 12. In addition, the sandwiching of the drive and sense ZnO elements 34 and 36 between the $SiO_2$ layer 67 and the $Si_3N_4$ layer 68 blocked the leakage paths of the piezoelectrically induced charges, and the formation of depletion layers in the ZnO films were ensured. Consequently, the piezoelectrically-induced charges have long decay time constants, thus ensuring device operation in the low frequency spectrum.

The electrical interconnects were next formed as a 0.2 micron thick aluminum layer 70 as indicated in FIG. 7. Since the EDP used in the micromachining process would attack both the aluminum 70 and the PSG 66, a protective 4 micron layer of polyimide (not shown) was applied next. The polyimide layer also served to support the microbridges 22, 24 and 26, 28 so as to prevent damage during subsequent processing.

The microbridges 22, 24 and 26, 28 were then formed during the micromachining of the peripheral proof mass 12 and the constraining bridges 40. In a preferred embodiment, the thickness, width and length of the microbridges 22, 24 and 26, 28 were 4, 100 and 500 microns, respectively. The peripheral proof mass 12 was micromachined using an orientation-dependent EDP etch. Preferably, the same etching step yields eight boron-doped silicon constraining bridges 40 from the first boron-doped layers 58 on the lower surface of the substrate 62.

As noted before, the microaccelerometer of the present invention is generally intended to operate under a vacuum in order to maximize vibrational amplitude. The packaging process encompasses mounting the central support body 14 to the backing chip 16 using vacuum epoxy 42 which has a low vapor pressure and is stable up to approximately 250° C. As noted above, the gap between the mechanical stoppers 38 and the lower surface of the peripheral proof mass 12 is provided to be approximately 10 microns. The assembled chip is then attached to a standard integrated circuit (IC) package such as a 24 pin DIP 48 again using a vacuum epoxy 46. The DIP is then hermetically sealed with a metal cover 52 under vacuum using a low melting tin-gold alloy 50.

A significant advantage of the present invention as described above is that the proof mass of the microaccelerometer is provided as a peripheral proof mass 12 which is less affected by off-axis disturbances. Another distinct advantage of the present invention is that the microbridges 22, 24 and 26, 28 are driven piezoelectrically, which alleviates the exacerbation of the detrimental effects due to any deviation from four-fold symmetry of the proof mass 12 and the presence of any geometrical mismatch between each opposing pair of microbridges 22, 24 and 26, 28, and between each microbridge and its corresponding sense electrode 36.

A further advantage is that there is no gap provided between the sense electrodes 36 and their corresponding microbridges 22, 24 and 26, 28. Hence, no squeeze film effect occurs to interfere with the vibration of the microbridges 22, 24 and 26, 28. Therefore, packaging vacuum requirements may be relaxed while still achieving a high quality factor. For example, quality factors of 300 and 3,000 have been attained in tests performed at one atmosphere and under a vacuum of 100 mTorr, respectively. This large increase in the quality factor realized at 100 mTorr over the previously noted value of 600 for the electrostatically driven microaccelerometer of the prior art is mainly attributed to the elimination of the narrow squeeze film gap between the microbridges 22, 24 and 26, 28 and their sense electrodes 36. As a result, in certain applications which do not require high sensing resolution, vacuum packaging may not be necessary at all. Moreover, the ability to achieve a high quality factor without the requirement for packaging vacuum enhances the feasibility of mass production.

The above structural characteristics, in conjunction with a predetermined package vacuum of as little as approximately 1 Torr, will cause underdamping in the microbridges 22, 24 and 26, 28 while producing critical damping of the peripheral proof mass 12 so that the z-directional displacement of the peripheral proof mass 12 is effectively suppressed, further minimizing the effect of z-directional perturbations.

Finally, the use of the peripheral proof mass 12 yields a large mass for a given chip area, hence the silicon real estate is more efficiently used.

Therefore, while our invention has been described in terms of a preferred embodiments, it is apparent that other forms of the device could be adopted by one skilled in the art. By example, the intent of the present invention could also be met through by employing thermal drive techniques which also avoid the previous problems noted with electrostatic drives. In addition, an alternative microbridge pattern could be used with the same piezoelectric technique disclosed herein. Also, it is clear that these teachings could be used with modified or alternative materials, or with modified processing parameters. It is therefore readily observable by those skilled in the art that there are other parameters which can affect geometrical matching, including the specific processes used, the thicknesses of the different materials used, and the specific geometry of the proof mass 12 and its supporting substrate. Accordingly, the scope of our invention is to be limited only by the following claims.

The embodiments of this invention in which an exclusive property or privilege is claimed are defined as follows:

1. An accelerometer comprising:
    a backing chip, said backing chip having at least one upwardly extending support means;
    a central support body supported by said support means above said backing chip;
    a peripheral proof mass circumscribing said central support body with a gap provided along the entire perimeter between aid central support body and said peripheral proof mass;
    at least two pairs of bridges for suspending said peripheral proof mass from said central support body, each bridge of said pairs of bridges spanning said gap between said central support body and said peripheral proof mass, each said pair of bridges having a first bridge with one end attached to one side of said central support body and second bridge attached to an opposite side of said central support body, said first and second bridges extending oppositely from said central support body and being attached at an opposite end to said peripheral proof mass so as to suspend said peripheral proof mass circumferentially around said central support body and above said backing chip, said first and second bridges being positioned on said central support body such that a longitudinal axis through each said first and second bridges forms a common axis through said central support body, said common axis of a first pair of bridges being perpendicular to said common axis of a second pair of bridges;
    a piezoelectric drive means on one end of each said bridge, each of said piezoelectric drive means vibrating at the resonant frequency of the bridge on which it is disposed, said resonant frequency changing as a function of an extension or compression of said bridge as a consequence of acceleration of said peripheral proof mass, said piezoelectric drive means being part of a film of piezoelectric material on said central support body and said bridge;
    a piezoelectric sensing means on the opposite end of each said bridge, said piezoelectric sensing means detecting a change in resonant frequency of each said bridge as a function of an extension or compression of said bridge as a consequence of acceleration of said peripheral proof mass, said piezoelectric sensing means being part of a film of piezoelectric material on said central support body and said bridge;
    circuitry means for amplifying and buffering said output of each said piezoelectric sensing means, said circuitry means providing an indication of acceleration in a direction along each said common axis, each said circuitry means providing feedback to each said piezoelectric drive electrode for compensating for said change so as to maintain each said bridge at its corresponding resonant frequency;
    at last one stop to prevent deflection of said peripheral proof mass beyond a predetermined distance in a direction perpendicular to said common axes; and
    a plurality of constraining bridges extending between said central support body and said peripheral proof mass, said plurality of constraining bridges acting to suppress rotation of said peripheral proof mass relative to said central support body and to help suppress displacement of said peripheral proof mass in said direction perpendicular to said longitudinal axes.

2. An accelerometer as recited in claim 1 wherein said pairs of bridges are disposed on a first surface of said accelerometer, and said plurality of constraining bridges are disposed on a surface of said accelerometer opposite said first surface.

3. An accelerometer as recited in claim 1 wherein said central support body is formed from single crystal silicon.

4. An accelerometer as recited in claim 1 wherein said piezoelectric drive means and said piezoelectric sensing means comprise a film of zinc oxide.

* * * * *